United States Patent
Quesada Perez

(10) Patent No.: US 9,993,808 B1
(45) Date of Patent: Jun. 12, 2018

(54) METHOD FOR PREPARING NANOSIZED SULFIDE CATALYSTS

(71) Applicant: KUWAIT INSTITUTE FOR SCIENTIFIC RESEARCH, Safat (KW)

(72) Inventor: Andres Miguel Quesada Perez, Kuwait (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days. days.

(21) Appl. No.: 15/484,062

(22) Filed: Apr. 10, 2017

(51) Int. Cl.
| | |
|---|---|
| *B01J 27/00* | (2006.01) |
| *B01J 27/051* | (2006.01) |
| *C01G 39/06* | (2006.01) |
| *C01G 53/11* | (2006.01) |
| *C01G 51/00* | (2006.01) |
| *B01J 35/00* | (2006.01) |
| *B01J 37/04* | (2006.01) |
| *B01J 37/10* | (2006.01) |
| *B01J 37/20* | (2006.01) |
| *B01J 37/00* | (2006.01) |
| *C10G 45/08* | (2006.01) |

(52) U.S. Cl.
CPC ......... *B01J 27/0515* (2013.01); *B01J 27/051* (2013.01); *B01J 35/0013* (2013.01); *B01J 37/009* (2013.01); *B01J 37/0072* (2013.01); *B01J 37/04* (2013.01); *B01J 37/10* (2013.01); *B01J 37/20* (2013.01); *C01G 39/06* (2013.01); *C01G 51/30* (2013.01); *C01G 53/11* (2013.01); *C10G 45/08* (2013.01); *C01P 2004/62* (2013.01); *C01P 2004/64* (2013.01); *C10G 2300/202* (2013.01)

(58) Field of Classification Search
CPC .. B01J 27/0515; B01J 27/051; B01J 35/0013; B01J 37/04; B01J 37/20; B01J 37/009; B01J 37/0072; B01J 37/10; C01G 39/06; C01G 53/11; C01G 51/30; C10G 45/08; C10G 2300/202; C01P 2004/62; C01P 2004/64
See application file for complete search history.

(56) References Cited

U.S. PATENT DOCUMENTS

| | | | |
|---|---|---|---|
| 4,243,553 A | 1/1981 | Naumann et al. | |
| 7,968,503 B2 | 6/2011 | Yadav | |
| 8,802,587 B2 * | 8/2014 | Nguyen | B01J 23/24 502/216 |

OTHER PUBLICATIONS

Shekarriz, M. A. R. Z. I. E. H., et al. "Nanoemulsion concept to enhance deep slurry hydrocracking process." 21st World Petroleum Congress. World Petroleum Congress, 2014.*

* cited by examiner

*Primary Examiner* — Richard M Rump
(74) *Attorney, Agent, or Firm* — Richard C. Litman

(57) ABSTRACT

A method for preparing nanosized sulfide catalysts includes providing an aqueous solution having an organometallic complex, mixing the organometallic complex with a sulfiding agent, an emulsifier, and a hydrocarbon oil to prepare a water-in-oil nanoemulsion; subjecting the water-in-oil nanoemulsion to thermal decomposition and isolating a solid product from the liquid.

18 Claims, 14 Drawing Sheets

METHOD FOR PREPARING NANOSIZED SULFIDE CATALYSTS

BACKGROUND OF THE INVENTION

1. Field of the Invention

The present invention relates to nanosized metallic catalysts, and particularly, to the preparation of nanosized monometallic and bimetallic sulfide catalysts by in-situ thermal decomposition.

2. Description of the Related Art

Catalysts can be generally categorized in one of two classes, namely supported and unsupported catalysts. Supported catalysts are more widely used due to several advantages including the high surface area available to anchor active phases (usually metals) predominantly responsible for the catalytic activity on the support. Supported catalysts may also be advantaged over unsupported catalysts as no separation of catalysts from reactants is required from within or outside the reaction vessel. However, when performing under conditions and with feedstocks that inevitably produce solid deposits within the porous network of the catalyst support, a progressive loss of catalyst performance due to pore plugging occurs, making larger quantities of catalysts required for a given process to ensure that the reactions progress efficiently As unsupported catalysts are not physically supported on a solid matrix; they may be less expensive to produce. In reactions where unsupported catalysts are soluble in the reaction media, they may be disadvantaged by the difficulties of recovering them from the products stream which will increase reaction or production costs as catalysts must be replaced or, alternatively requires that the reactants are subjected to costly separation processes. However, unsupported catalysts with particle size below the micron range are advantaged over supported catalysts by increasing the surface area available of active sites for reaction and thus, may enable a reaction to proceed more efficiently as compared to a reaction utilizing a supported catalyst.

Catalyst activity is strongly related to the accessibility of the reactive molecules to the active size of the catalyst. The active sites of the catalyst are dispersed on the catalyst surface area. The active sites of the catalyst are located at the internal surface area of the catalyst and the external surface area of the catalyst. The internal surface area of the catalyst is located inside the pores and internal channels contained in the catalyst. The internal/external surface area ratio depends on the pore size. Smaller particle size increases the surface area and the ratio external/internal area. Thus, reducing the particle size leads to more reactive surface area.

One area of challenge in catalysis is converting heavy crude oil fractions including asphaltenes into lighter products. Asphaltenes are molecular substances that are found in crude oil, along with resins, aromatic hydrocarbons, and saturates (i.e., saturated hydrocarbons such as alkanes). Asphaltenes in the form of asphalt or bitumen products from oil refineries are used as paving materials on roads, shingles for roofs, and waterproof coatings on building foundations.

Asphaltenes impart high viscosity to crude oils. In view of the steric hindrance of large organic molecules to supported catalysts, there is reduced accessibility of the active catalyst particles to the asphaltene internal structure for catalytic conversion. Therefore, it would be desirable to provide active catalyst nanoparticles with increased accessibility to the asphaltene internal structure for conversion of asphaltene.

Monometallic and bimetallic sulfides particles have been prepared and evaluated for hydrodesulfurization. For example, US Patent Application Publication Nos. 200710161505 and US2009023965A1, disclose ultra dispersed metal sulfide based catalysts. However, the proposed methodology produces aggregate of nanoparticles ranging from 30 to 6,000 nm and around 150 to 600 nm.

Thus, a method of synthesizing nanosized mono metallic and bimetallic sulphide catalysts solving the aforementioned problems is desired.

SUMMARY OF THE INVENTION

A method for preparing monometallic or bimetallic nanosized sulfide catalysts includes providing an aqueous solution having an organometallic complex, mixing the organometallic complex with a sulfiding agent, an emulsifier, and a hydrocarbon oil to prepare a water-in-oil nanoemulsion; subjecting the water-in-oil nanoemulsion to thermal decomposition and isolating a solid product from the liquid.

The emulsifier can include at least one of sorbitan monolaurate, sorbitan monopalmitate, sorbitan monostearate, sorbitan monooleate, polyoxyethylene lauryl ether, polyethyleneglycol lauryl ether, polyethylene glycol hexadecyl ether, polyoxyethylene cetyl ether, polyoxytheylene (20) oleyl ether and didodecyldimethylammonium bromide (DDAB). The pH of the aqueous organometallic complex can be about 10.

The solid product can be a molybdenum sulfide catalyst, represented by the molecular formula $MoS_2$. The solid product can include monometallic or bimetallic sulfide compounds like cobalt-molybdenum sulfide, nickel molybdenum sulfide or mixtures thereof. The nanoparticles of molybdenum sulfide catalysts typically possess a diameter less than 500 nm, e.g., about 40 nm to about 50 nm.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
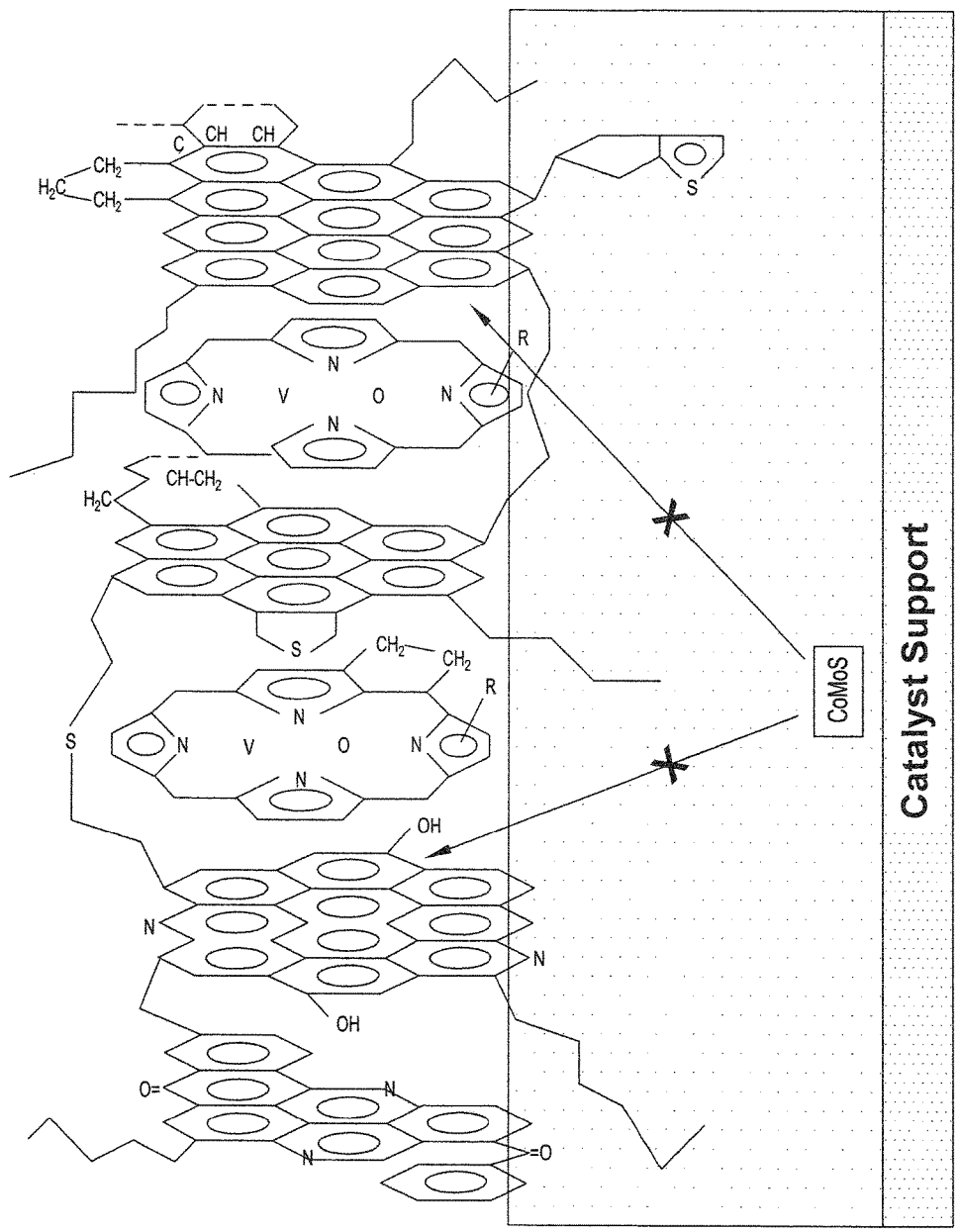
FIG. 1A shows a schematic of the active catalyst particles in a supported catalyst.

A method for preparing monometallic or bimetallic nanosized metallic sulfide catalysts includes in situ thermal decomposition of a water-in-oil nanoemulsion including an organometallic complex and a sulfiding agent. In particular, the method includes preparing an aqueous solution comprising an organometallic complex and a sulfiding agent, mixing the organometallic complex and sulfiding agent with a hydrocarbon oil and an emulsifier to prepare a water-in-oil nanoemulsion; subjecting the water-in-oil nanoemulsion to thermal decomposition and isolating a solid nanosized metallic sulfide product. The nanoparticles of molybdenum sulfide catalysts typically have a diameter less than 500 nm. For example, the diameter of the nanoparticles can be about 40 nm to about 50 nm.

The organometallic complex can include a Group VIII B non-noble metal and at least one Group VI B metal. The Group VI B metal can include chromium, molybdenum, tungsten and mixtures thereof. The Group VIII B can include non-noble metals include, iron, cobalt, nickel or mixtures thereof. The atomic ratio of the Group VI B metal to the Group VIII B non-noble metal can be about 2:12. The Group VI B metals can be in the form of polyanions, such as molybdates, tungstates, chromates, dichromate; or oxides such as molybdenum oxides, tungsten oxides, and chromium oxides. The Group VIII B non-noble metals can be in the form of water-soluble metal salts such as acetate, carbonate, chloride, nitrate, acetylacetonate, citrate and oxalate.

The thermal decomposition can include performing a hydrotreating reaction under the operational conditions provided in the table below.

TABLE

REACTION CONDITIONS

| | |
|---|---|
| Temperature ° C. | 250-400 |
| Pressure (MPa) | 30 |
| LHSV (h$^{-1}$) | 0.5-4 |
| H$_2$ Flow (SCCM) | 200-1000 |

According to an embodiment, the aqueous organometallic complex can be prepared by combining ammonium heptamolybdate ($H_{24}Mo_7N_6O_{24}$) with at least one Group VIII B metal salt and a sulfiding agent to form an aqueous organometallic complex. The aqueous organometallic complex is prepared under controlled conditions. The controlled conditions can include conditions under which a pH of about 5-12, e.g., about pH 10, is maintained. The aqueous organometallic complex is maintained under specific pH conditions to obtain the monomeric-tetrahedral structure of molybdenum.

The ammonium heptamolybdate can include about 5-10% wt. of Mo. A ratio of sulfiding agent to molybdenum can be about 2:4. The sulfiding agent can include at least one of tertiary-butyl polysulfide, carbon disulfide, and dimethyl disulfide. The organometallic complex can be monometallic or bimetallic. The metallic sulfide product can be a molybdenum sulfide catalyst represented by the formula $MoS_2$.

According to an embodiment, the water-in-oil nanoemulsion can be prepared by mixing about 80 wt. % to about 95 wt. % oil (e.g., Paraffin/Aromatic-70/30 wt. %) with about 5 wt. % to about 30 wt % emulsifier and about 1 wt % to about 10 wt % of the aqueous organometallic complex. The hydrocarbon oil used with the emulsifier can be paraffinic or aromatic depending on the selected emulsifier.

Suitable emulsifiers can include, for example, Span 20 (Sorbitan monolaurate); Span 40 (Sorbitan monopalmitate); Span 60 (Sorbitane monostearate); Span 80 (Sorbitan monooleate); Brij 35 (Polyoxyethylene lauryl ether, Polyethyleneglycol lauryl ether); Brij 58 (Polyethylene glycol hexadecyl ether, Polyoxyethylene cetyl ether); Brij 98 (Polyoxyethylene (20) oleyl ether); and DDAB (Didodecyldimethylammonium Br). For example, the emulsifier can include at least one of sorbitan monostearate and ethoxylated fatty alcohols (having a HLB value in the range of 4-16). Preferably, the emulsifier is didodecyldimethylammonium bromide (DDAB).

Figure 1B:
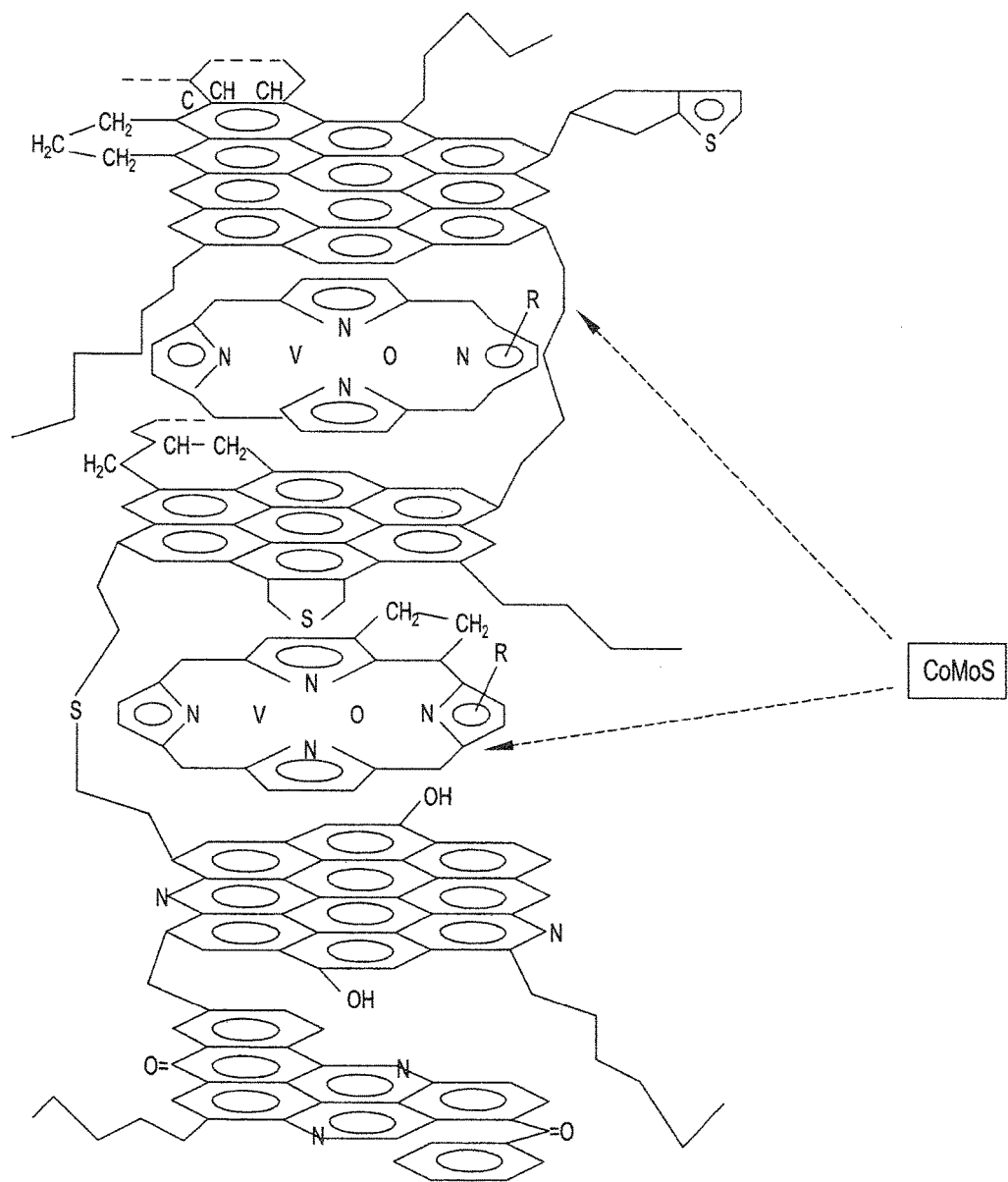
FIG. 1B shows a schematic of the active catalyst particles in an unsupported catalyst.

Referring to FIG. 1A, it can be seen that catalysts supported on a rigid support are less efficient in accessing the asphaltene molecule due to steric hindrance and reduced accessibility of the active catalyst particles to the asphaltene internal structure. In contrast, unsupported catalysts that are nanosized can have increased accessibility to the asphaltene internal structure (FIG. 1B).

Figure 2:
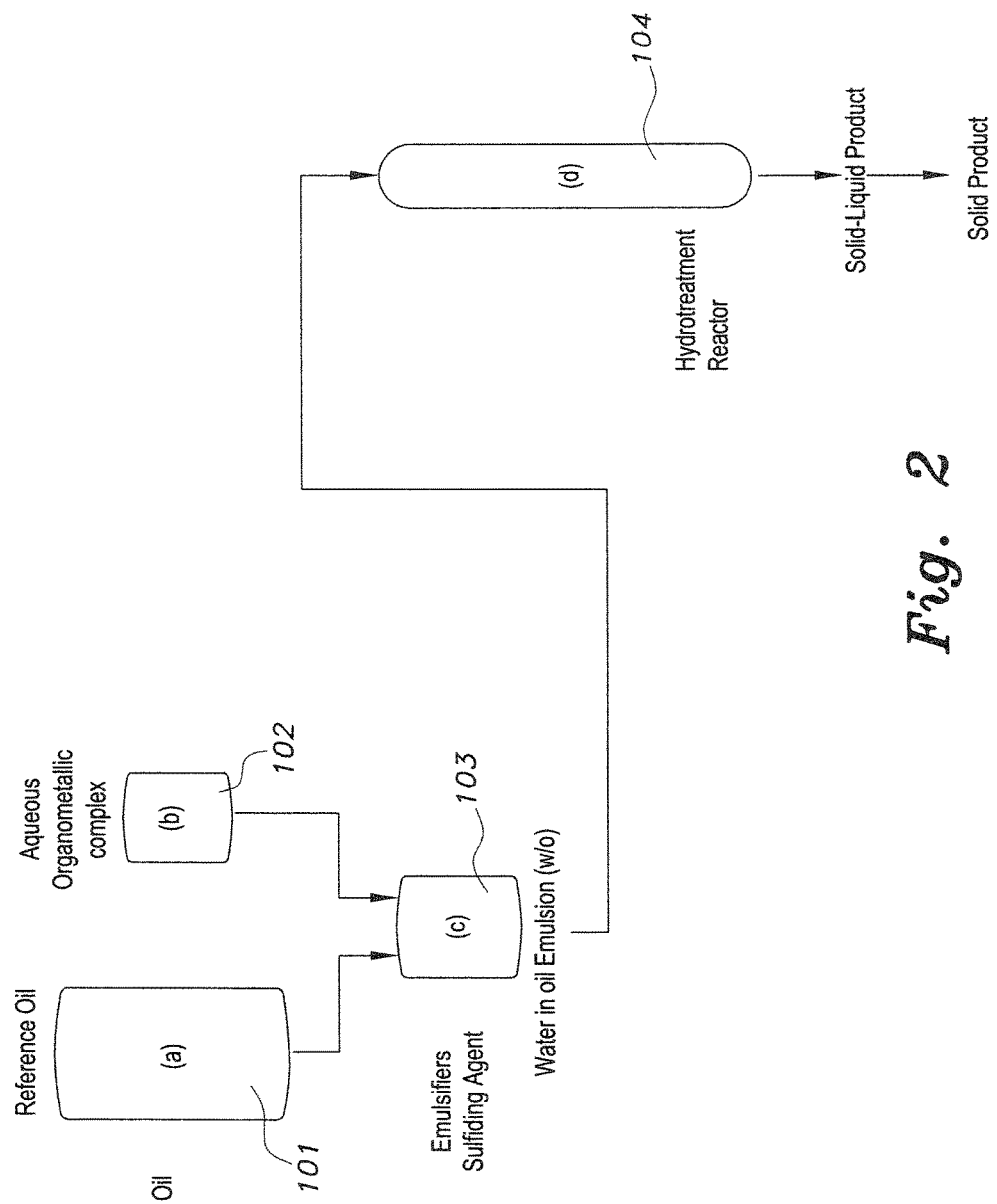
FIG. 2 is a schematic of the reaction process for preparing nanosized sulfide catalysts.

Referring to FIG. 2, the process of generating the nanosized sulfide catalyst is described. An aqueous organometallic complex 102 is mixed with a reference oil 101 in a mixing chamber 103. An emulsifier and a sulfiding agent are added to the mixture to create an oil-in-water nanoemulsion and mixed thoroughly. Preferably, a mechanical stirring device, such as a Ruston impeller, is used for stirring at a speed of 200-300 rpm for about five minutes. The mixture is left to stand for 15-30 minutes without stirring. The oil-in-water nanoemulsion is then transferred to a hydrotreatment reactor for undergoing thermal decomposition of the nanoemulsions, and thereby, providing a solid-liquid product. Finally, the solid product is isolated from the liquid to yield the nanosized sulfide catalysts.

The methods described herein provide nanosized metallic sulfide catalysts with an average particle size below 500 nm. For example, the present methods can provide monometallic and bimetallic sulfide nanoparticles below 100 nm, e.g., from about 40 nm to about 50 nm. The sulfide nanoparticles can be active catalyst particles that can access the asphaltene internal structure in heavy oil fractions for increased conversion of heavy oil fractions into lighter oil fractions.

The following examples are provided by way of illustration.

EXAMPLE 1

Preparation of Organometallic Complex

Figure 3A:
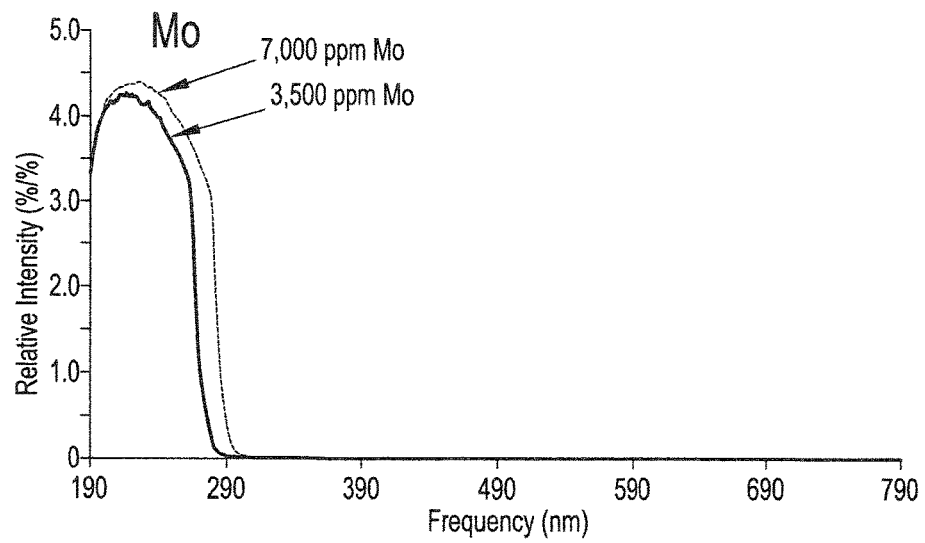
FIG. 3A is a UV-vis spectrum of Molybdenum (Mo) complex.
Figure 3B:
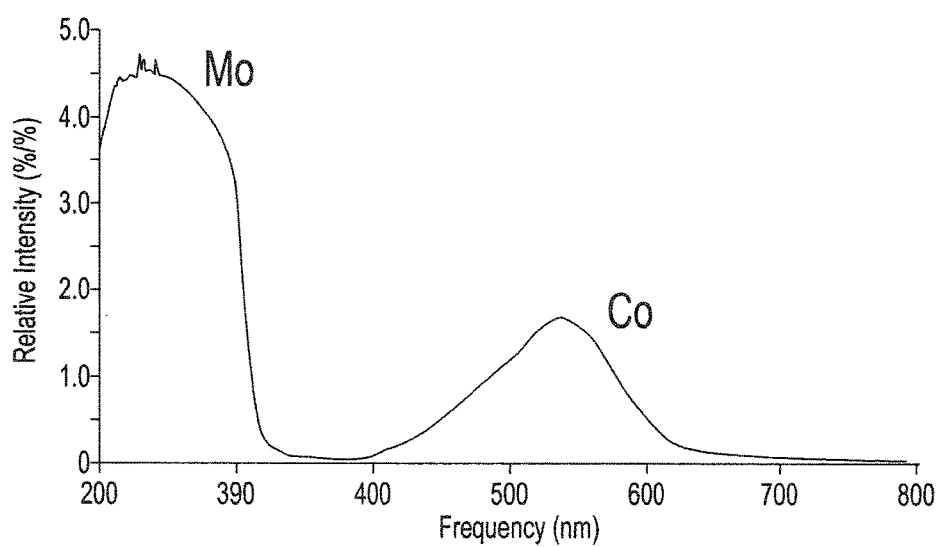
FIG. 3B is a UV-vis spectrum of CoMo complex.
Figure 3C:
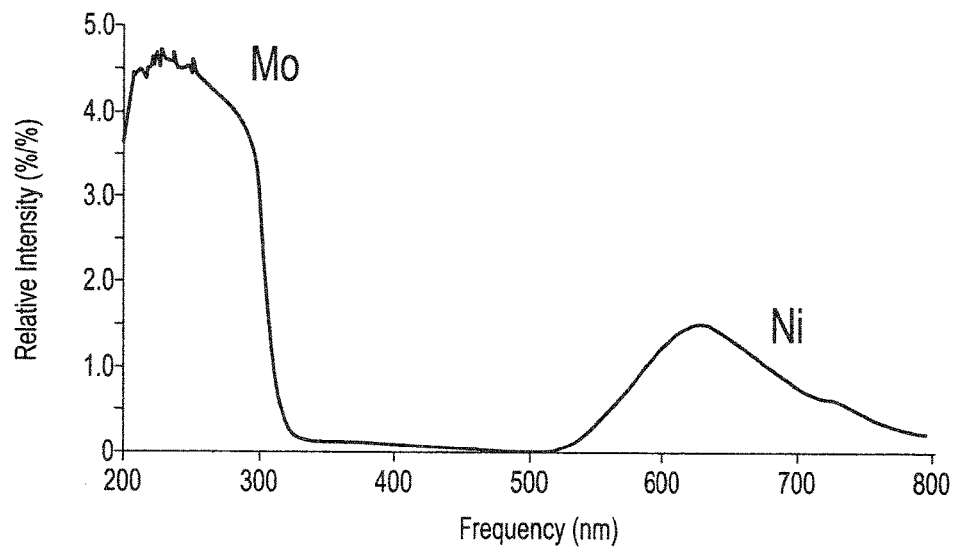
FIG. 3C is a UV-Vis spectrum of NiMo complex.

In a flask, ammonium heptamolybdate ($H_{24}Mo_7N_6O_{24}$) was dissolved in an aqueous solvent by stirring. The concentration of ammonium heptamolybdate was 5-10 wt % of molybdenum. Salts of group VIIIb, e.g., Fe, Co, Ni, were mixed in with the molybdenum. salt. The ratio of molybdenum to the salts was about 2:12. A pH of 5-12 was maintained. A sulfiding agent was added at a 2:4 (sulfiding agent:molybdenum) ratio. FIG. 3A shows an absorption spectrum of ammonium heptamolybdate. FIG. 3B shows an absorption spectrum of an ammonium heptamolybdate and cobalt acetate complex. FIG. 3C shows an absorption spectrum of a nickel acetate and ammonium heptamolybdate complex.

EXAMPLE 2

Preparation of Water-in-Oil Nanoemulsion

The water-in-oil nanoemulsion was prepared by mixing the following ingredients: 80-95 wt. % oil (n-parraffin/aromatic-70/30 wt %); 5-30 wt % emulsifier (SPAN, BRIJ, DDBA having a HLB 4-16); 1-10 wt % aqueous organometallic complex; sulfiding agent (2:4 ratio of Sulphur to molybdenum (DMDS; $CS_2$). The ingredients were mixed thoroughly using a Ruston impeller at 200-300 rpm for about five minutes and left to stand for 15-30 minutes without stirring. The prepared nanoemulsions have a water drop size around 5 to 20 nm, around 7 nm.

EXAMPLE 3

Thermal Decomposition of the Nanoemulsions

The oil-in-water nanoemulsion comprising the emulsifier, organometallic complex and the sulfiding agent were placed in a hydrotreatment reactor. The hydrotreating operational conditions were as follows: 250-400° C. (482-752° F.); 30 Bar (435 psig); 0.5-4 $h^{-1}$ (LHSV); and 200-1000 vol. $H_2$/vol feed. The feed was sprayed towards the down flow. The solid product was isolated from the liquid, filtered and dried. The dried product was then characterized by X-ray photoelectron spectroscopy.

Figure 4A:
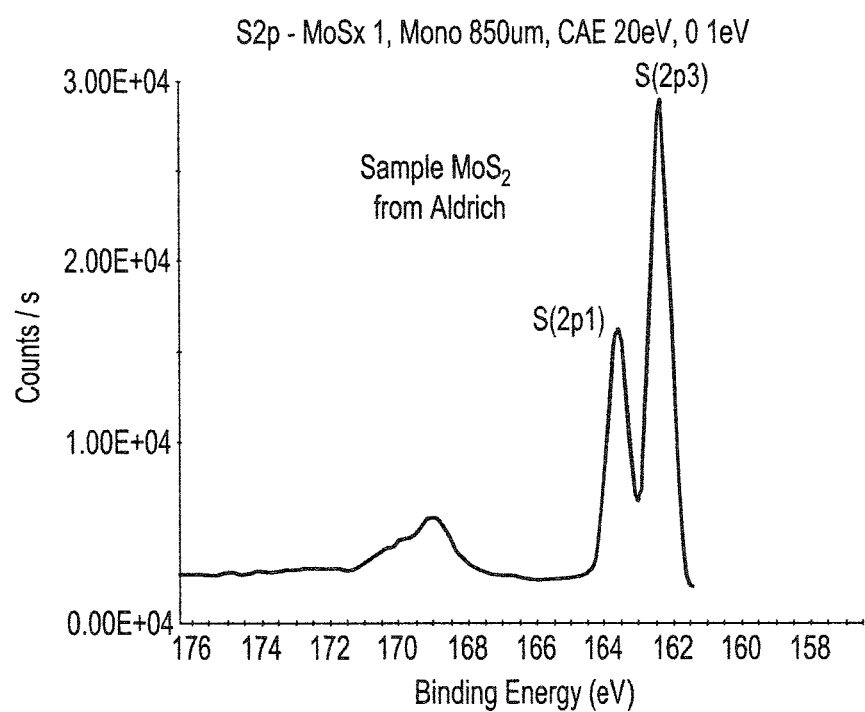
FIG. 4A shows exemplary X-ray photoelectron spectroscopy (XPS) signals S(2p1) and S(2p3) of a reference sample of molybdenum sulfide $MoS_2$.
Figure 4B:
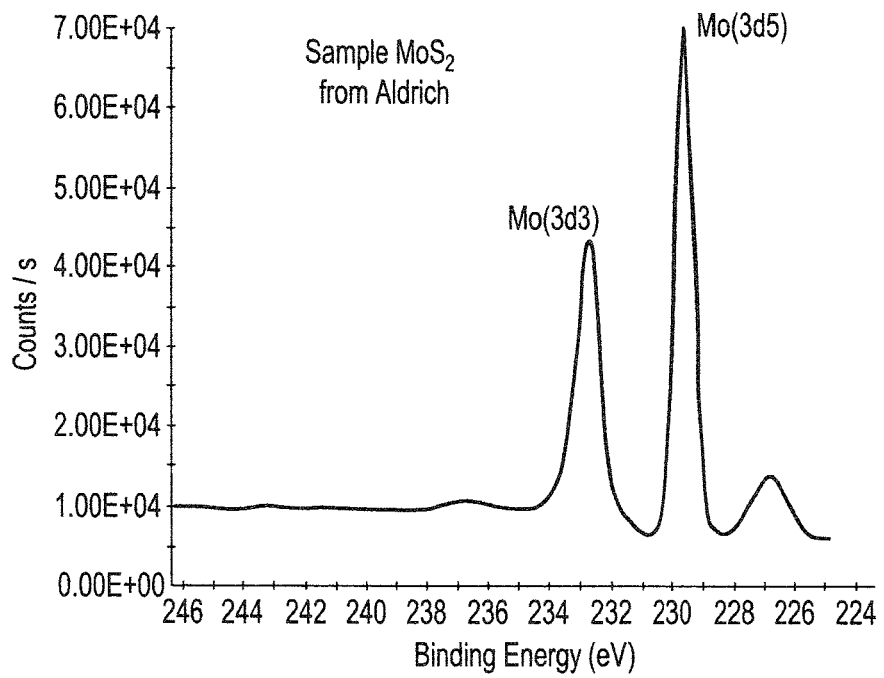
FIG. 4B shows exemplary X-ray photoelectron spectroscopy (XPS) signals Mo(3d3) and Mo(3d5) of a reference sample of molybdenum sulfide $MoS_2$.
Figure 5A:
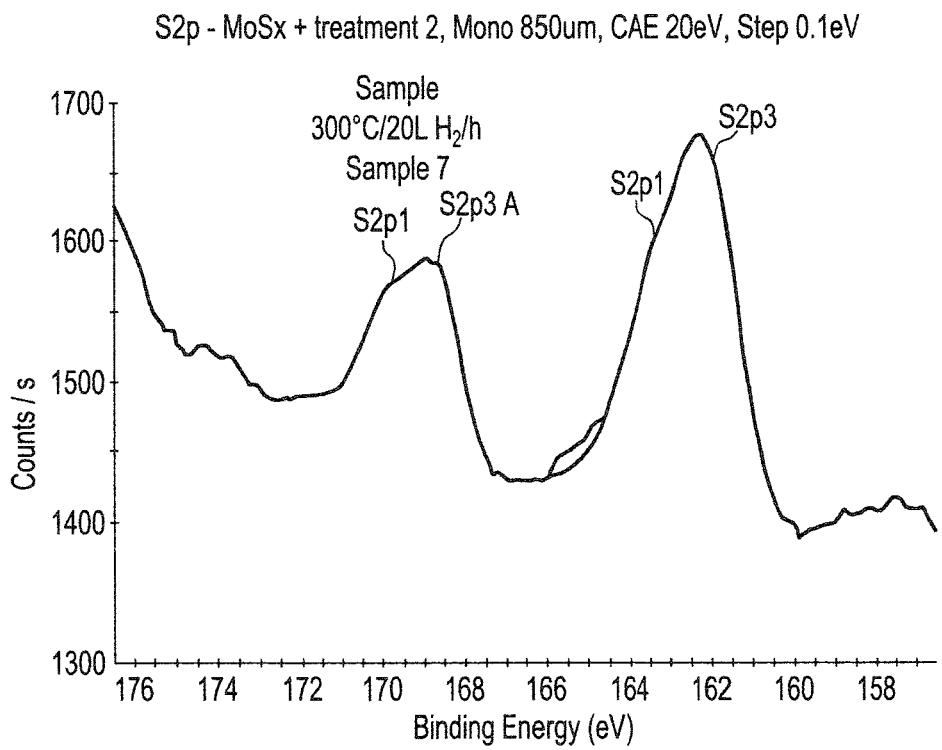
FIG. 5A shows the signals S(2p1) and S(2p3) from the XPS spectrum of the Mo sulfide obtained by thermal decomposition of a nanoemulsion containing molybdenum complex.
Figure 5B:
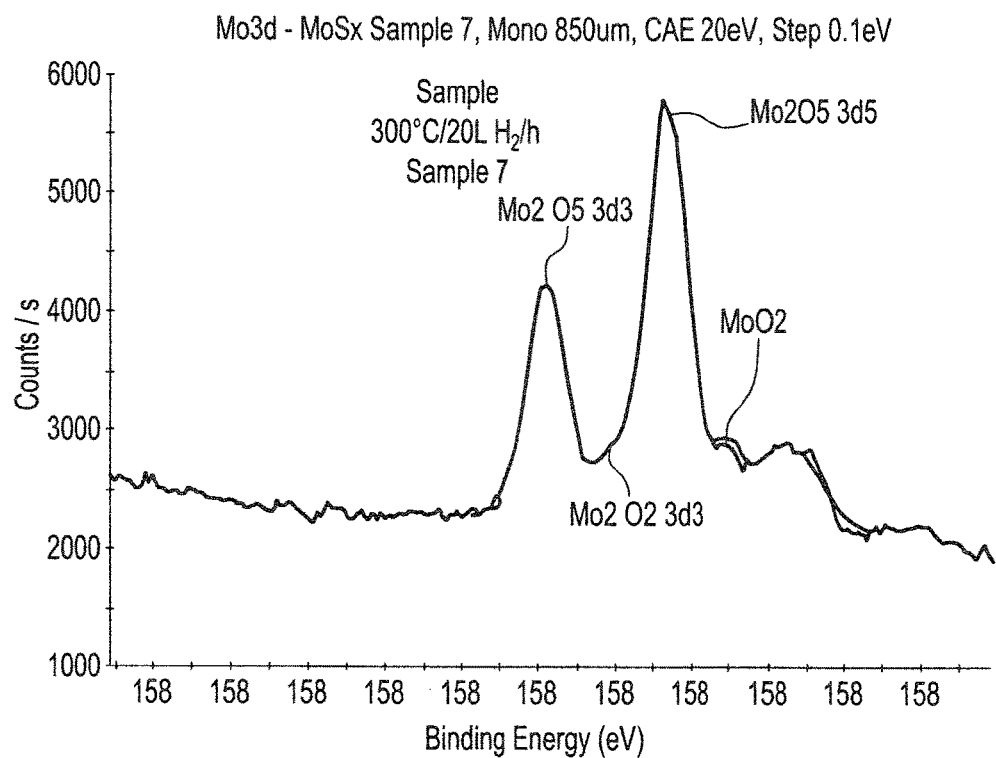
FIG. 5B shows the signals Mo(3d3) and Mo(3d5) from the XPS spectrum of the Mo sulfide obtained by thermal decomposition of Mo nanoemulsion.
Figure 6A:
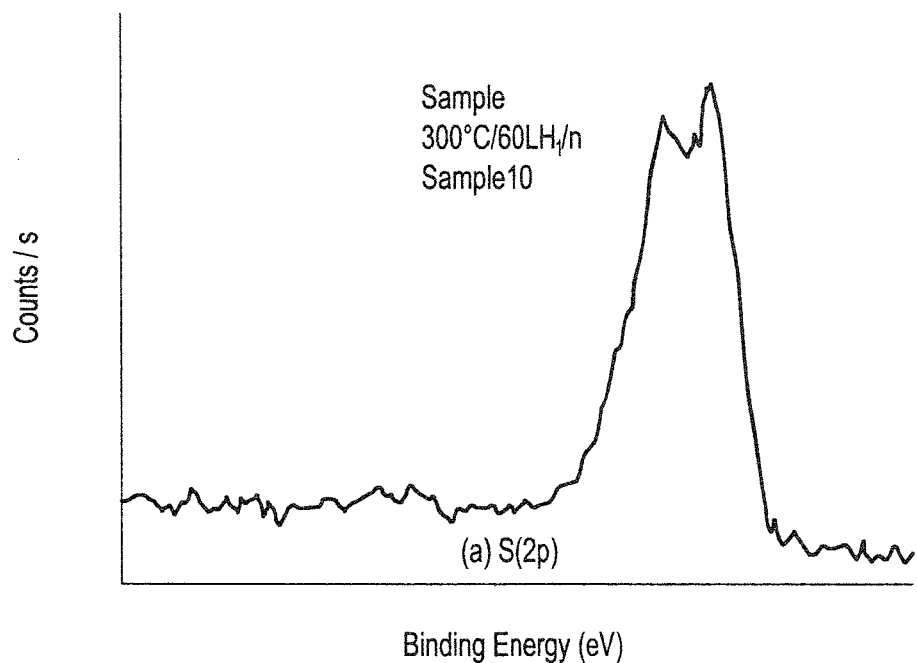
FIG. 6A shows the signals S(2p1) and S(2p3) from the XPS spectra of NiMo sulfide catalyst that was obtained by the thermal decomposition of NiMo nanoemulsion.
Figure 6B:
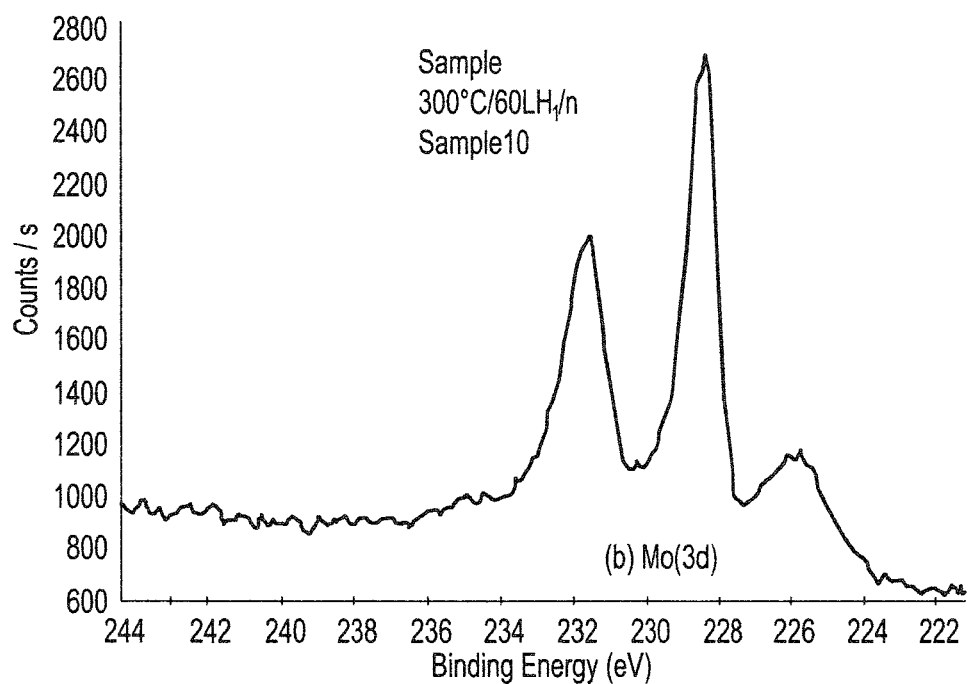
FIG. 6B shows the signals Mo(3d3) and Mo(3d5) from of the XPS spectra of NiMo sulfide catalyst that was obtained by the thermal decomposition of NiMo nanoemulsion.
Figure 6C:
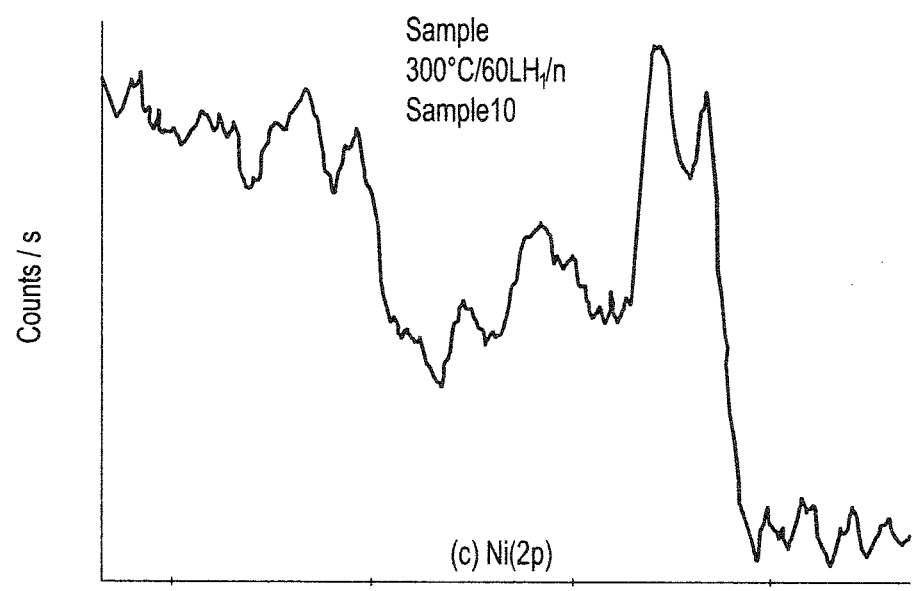
FIG. 6C shows the signals Ni(2p) from the XPS spectra of NiMo sulfide catalyst that was obtained by the thermal decomposition of NiMo nanoemulsion.
Figure 7A:
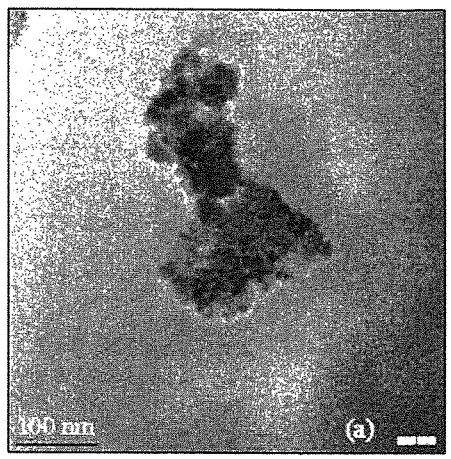
FIGS. 7A-7D shows the transmission electron micrographs of $MoS_2$ obtained by thermal decomposition at various magnifications a) 100 nm b) 50 nm c) 20 nm and d) 10 nm respectively.
Figure 7B:
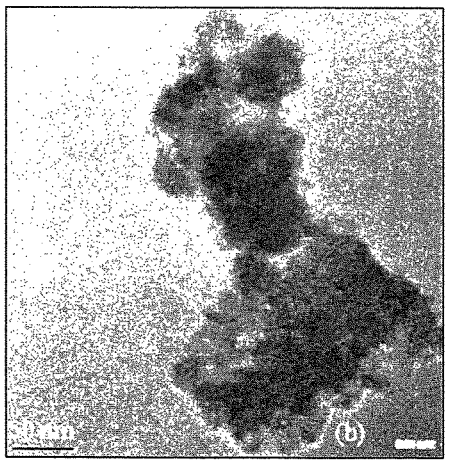
Figure 7C:
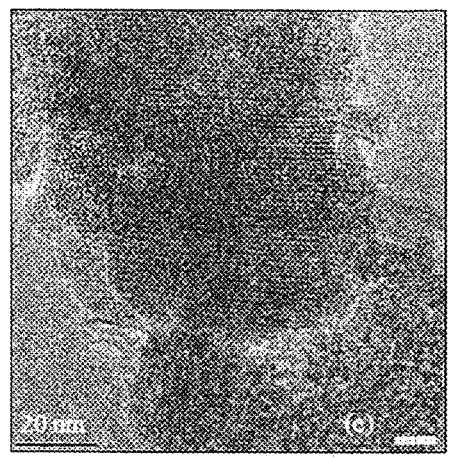
Figure 7D:
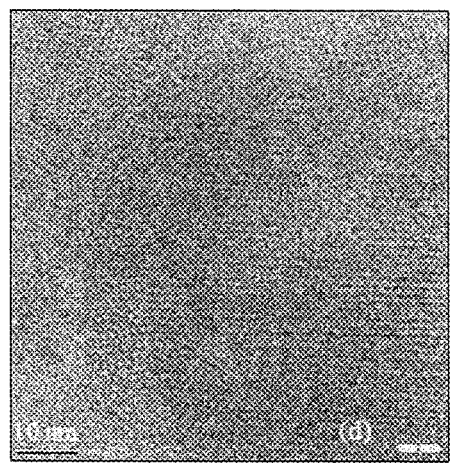

FIGS. 4A and 4B show the X-ray Photoelectron Spectroscopy (XPS) signals (eV) of molybdenum sulfide ($MoS_2$) (from 170 to 230 eV obtained from Aldrich). FIGS. 5A and 5B show the XPS spectrum of $MoS_2$ catalyst that was obtained by the thermal decomposition of Mo nanoemulsion (from 150 to 230 eV). The XPS spectra reconfirm the fact that the $MoS_2$ catalyst was obtained by the thermal decomposition of Mo nanoemulsion. FIGS. 6A-6C show the XPS spectra of NiMo sulfide catalyst that was obtained by the thermal decomposition of NiMo nanoemulsion. FIG. 6A corresponds to sulfide. FIG. 6B corresponds to molybdenum. FIG. 6C corresponds to nickel.

FIGS. 7A-7D depict the TEM images for the $MoS_2$ nanoparticles for the nano catalyst solids. The calculated average particle sizes were 40 nm and 50 nm.

It is to be understood that the present invention is not limited to the embodiments described above, but encompasses any and all embodiments within the scope of the following claims.

I claim:
1. A method for preparing monometallic or bimetallic nanosized sulfide catalysts, comprising:
preparing an aqueous solution including an organometallic complex and a sulfiding agent, the aqueous solution having a pH of about 5 to a pH of about 12;
mixing the aqueous organometallic complex solution with an emulsifier and a hydrocarbon oil to prepare a water-in-oil nanoemulsion, wherein the emulsifier is didodecyldimethylammonium bromide (DDAB); and
subjecting the water-in-oil nanoemulsion to thermal decomposition under hydrotreatment conditions to provide the nanosized sulfide catalysts.

2. The method of preparing nanosized sulfide catalysts according to claim 1, wherein the aqueous solution has a pH of 10.

3. The method of preparing nanosized sulfide catalysts according to claim 1, wherein the organometallic complex includes a Group VIII B non-noble metal and at least one Group VI B metal, an atomic ratio of the Group VI B metal to the Group VIII B non-noble metal being about 2:12.

4. The method for preparing nanosized sulfide catalysts according to claim 1, wherein the nanosized sulfide catalysts comprise a solid product.

5. The method for preparing nanosized sulfide catalysts according to claim 1, wherein the nanosized sulfide catalysts include molybdenum sulfide ($MoS_2$).

6. The method for preparing nanosized sulfide catalysts according to claim 1, wherein the organometallic complex is prepared by combining ammonium heptamolybdate ($H_{24}Mo_7N_6O_{24}$) with at least one group VIIIb metal salt.

7. The method for preparing nanosized sulfide catalysts according to claim 6, wherein the group VIIIb metal comprises at least one of iron, cobalt, and nickel.

8. The method for preparing nanosized sulfide catalysts according to claim 1, wherein the hydrocarbon oil is a straight or branched chain heptane.

9. The method for preparing nanosized sulfide catalysts according to claim 1, wherein the hydrotreatment conditions include temperatures in the range of about 250° C. to 400° C.

10. The method for preparing nanosized sulfide catalysts according to claim 1, wherein the hydrotreatment conditions include a pressure of about 30 bar and about 200-1000 volume of hydrogen per volume of the nanoemulsion.

11. The method for preparing nanosized sulfide catalysts according to claim 1, wherein the organometallic complex is monometallic or bimetallic.

12. The method for preparing nanosized sulfide catalysts according to claim 1, wherein the sulfiding agent includes at least one of tertiary-butyl polysulfide, carbon disulfide, and dimethyl disulfide.

13. The method for preparing nanosized sulfide catalysts according to claim 1, wherein the water-in-oil nanoemulsion comprises about 80-95 wt % oil, about 5-30 wt % emulsifier, and about 1-10 wt % aqueous organometallic complex.

14. The method for preparing nanosized sulfide catalysts according to claim 1, wherein a diameter of the nanosized sulfide catalysts is less than 500 nm.

15. The method for preparing nanosized sulfide catalysts according to claim 1, wherein a diameter of the nanoparticles is about 40 nm to about 50 nm.

16. The method for preparing nanosized sulfide catalysts according to claim 1, wherein the nanosized sulfide catalysts include at least one of monometallic and bimetallic sulfide complexes.

17. A method for preparing monometallic or bimetallic nanosized sulfide catalysts, comprising:
preparing an aqueous solution including an organometallic complex and a sulfiding agent, the aqueous solution having a pH of about 5 to a pH of about 12;
mixing the aqueous organometallic complex solution with an emulsifier and a hydrocarbon oil to prepare a water-in-oil nanoemulsion; and subjecting the water-in-oil nanoemulsion to thermal decomposition under hydrotreatment conditions to provide the nanosized sulfide catalysts, wherein the hydrotreatment conditions include a pressure of about 30 bar and about 200-1000 volume of hydrogen per volume of the nanoemulsion.

18. A method for preparing monometallic or bimetallic nanosized sulfide catalysts, comprising:

preparing an aqueous solution including an organometallic complex and a sulfiding agent, the aqueous solution having a pH of about 5 to a pH of about 12;

mixing the aqueous organometallic complex solution with an emulsifier and a hydrocarbon oil to prepare a water-in-oil nanoemulsion, wherein a diameter of the nanoemulsion is about 5 nm to about 20 nm, further wherein the emulsifier is selected from the group consisting of sorbitan monolaurate, sorbitan monopalmitate, sorbitan monostearate, sorbitan monooleate, polyoxyethylene lauryl ether, polyethyleneglycol lauryl ether, polyethylene glycol hexadecyl ether, polyoxyethylene cetyl ether, polyoxytheylene (20) oleyl ether and didodecyldimethylammonium bromide (DDAB); and subjecting the water-in-oil nanoemulsion to thermal decomposition under hydrotreatment conditions to provide the nanosized sulfide catalysts, wherein the hydrotreatment conditions include temperatures in the range of about 250° C. to 400° C., a pressure of about 30 bar and about 200-1000 volume of hydrogen per volume of the nanoemulsion, further wherein a diameter of the nanosized sulfide catalysts is about 40 nm to about 50 nm.

* * * * *